(Model.)

H. S. HOWARD.
HARROW TOOTH.

No. 265,084. Patented Sept. 26, 1882.

Witnesses.
Edwin L. Yerrell.
J. J. McCarthy.

Inventor.
Harlan S. Howard,
By C. N. Alexander,
Attorney.

UNITED STATES PATENT OFFICE.

HARLAN S. HOWARD, OF CHARLES CITY, IOWA.

HARROW-TOOTH.

SPECIFICATION forming part of Letters Patent No. 265,084, dated September 26, 1882.

Application filed September 1, 1881. Renewed August 24, 1882. (Model.)

*To all whom it may concern:*

Be it known that I, HARLAN S. HOWARD, of Charles City, in the county of Floyd and in the State of Iowa, have invented certain new and useful Improvements in Harrow-Teeth; and I do hereby declare that the following is a full, clear, and exact description thereof, reference being had to the accompanying drawings, and to the letters of reference marked thereon, making a part of this specification.

This invention relates to certain improvements in harrow-teeth; and it has for its objects to provide a tooth that may be readily driven into a hole formed by a suitable boring-instrument in the harrow-frame and firmly seated therein, and which will have a suitable cutting edge or edges, formed by beveling the bar from which the tooth is made from a suitable point along its sides down to its lower extremity, as more fully hereinafter specified. These objects I attain by the device illustrated in the accompanying drawings, in which—

Figure 1:
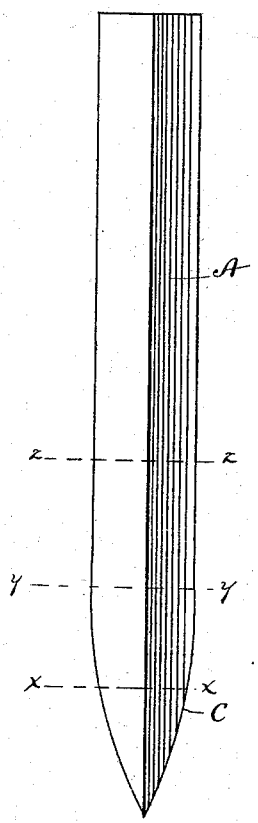
Figure 2:
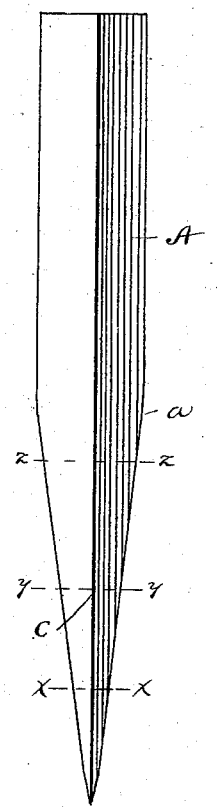
Figure 3:
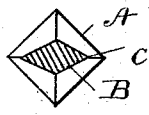
Figure 4:
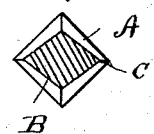
Figure 5:
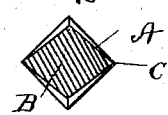

Figure 1 represents a side elevation of my improved harrow-tooth; Fig. 2, a front elevation of the same; and Figs. 3, 4, and 5 represent transverse horizontal sections on the lines $x\ x$, $y\ y$, and $z\ z$ of Figs. 1 and 2.

The letter A indicates the shank or upper part of the tooth, which is driven into and secured in an aperture in the harrow-frame formed by means of an ordinary auger or boring-tool. The said shank in cross-section is in the form of a square, and the aperture in the harrow-frame is made somewhat smaller than the external dimensions of the shank of the tooth, so that when the tooth is driven in it will become firmly and securely seated.

From the rectangular portion or shank of the tooth, commencing at about the point indicated by the letter $a$, the faces of the tooth are gradually changed from their parallel planes—that is to say, from the point of commencement of the bevel the plane thereof gradually changes or diverges from that of the sides of the shank of the harrow-tooth, increasing its angularity as it nears the lower extremity of the bar or point proper of the tooth, giving the lower portion or point of the tooth a gradually-changing rhomboidal form in cross-section, terminating in a point at the lower extremity, and forming an acute cutting edge at the front and rear of the tooth, the lower part of the tooth being virtually spread out into the shape of a dagger-blade, the most effective form for cutting through earth and roots.

As constructed it will be perceived that the improved tooth will possess the advantages of the rhomboidal teeth heretofore in use, which require to be carefully mortised in the wood, and the rectangular teeth, which possess virtually no cutting-edges, while at the same time it will act as a knife-blade, and will thoroughly cut and disintegrate the earth and perfectly sever any roots in the same.

I am aware that harrow-teeth have heretofore been constructed in the form of a rhomboid in cross-section, and do not therefore broadly lay claim to such construction as my invention, but do claim that herein set forth and particularly pointed out in my claim.

Having thus described my invention, what I claim, and desire to secure by Letters Patent, is—

A harrow-tooth having its shank constructed in the form of a square in cross-section, and its lower portion in the form of a rhomboidal pyramid, formed by gradually changing the plane of the bevel from that of the shank and terminating in a point, substantially as specified.

In testimony whereof I affix my signature, in presence of two witnesses, this 12th day of August, 1881.

HARLAN SMITH HOWARD.

Witnesses:
 A. SYLVESTER,
 W. H. DAVIS.